United States Patent

Shirai et al.

[11] Patent Number: 5,951,157
[45] Date of Patent: Sep. 14, 1999

[54] AUTOMOBILE HEADLAMP

[75] Inventors: Katutada Shirai; Yoshio Suehiro, both of Shizuoka, Japan

[73] Assignee: Koito Manufacturing Co., Ltd., Tokyo, Japan

[21] Appl. No.: 08/991,984

[22] Filed: Dec. 17, 1997

[30] Foreign Application Priority Data

Dec. 18, 1996 [JP] Japan ..................................... 8-338609
Jun. 27, 1997 [JP] Japan ..................................... 9-172358

[51] Int. Cl.$^6$ ....................................................... B60Q 1/06
[52] U.S. Cl. ........................ 362/529; 362/284; 362/324; 362/530; 362/424; 362/289
[58] Field of Search ................................... 362/514, 515, 362/523, 528, 529, 530, 531, 532, 287, 289, 294, 418, 419, 421, 422, 423, 424, 284.324

[56] References Cited

U.S. PATENT DOCUMENTS 5,573,326  11/1996  Iijima ........................................ 362/530
5,647,659   7/1997  Mori ......................................... 362/529
5,683,163  11/1997  Goldschmidt et al. .................. 362/529

FOREIGN PATENT DOCUMENTS

3515150A1  10/1996  Germany .............................. 362/532

Primary Examiner—Thomas M. Sember
Attorney, Agent, or Firm—Sughrue, Mion, Zinn, Macpeak & Seas, PLLC

[57] ABSTRACT

In an automobile headlamp, a light source unit in a lamp body is inclined vertically and horizontally with an aiming mechanism, the rotating operation sections of a vertical aiming screw and a horizontal aiming screw which form the aiming mechanism are provided outside of the lamp body, and the rotating operation sections are turned to incline the light source unit vertically and horizontally. In the automobile headlamp, a protruding wall is extended at least at the horizontal aiming screw in such a manner as to surround the rotating operation section of the horizontal aiming screw, and a part of the protruding wall extending end portion is integrated through a thin hinge with a lid, namely, a tongue-shaped plate in such a manner that the latter is extended in the same direction as the protruding wall. As for a specification that requires no horizontal aiming operation, the tongue-shaped plate is folded along the thin hinge and locked in such a manner as to close the opening of the protruding wall, to close the rotating operation section in the protruding wall with the tongue-shaped plate, thereby to make it impossible to perform the horizontal aiming operation.

13 Claims, 13 Drawing Sheets

AUTOMOBILE HEADLAMP

BACKGROUND OF THE INVENTION

1. Field of the Invention

The present invention relates to an automobile headlamp in which a light source unit accommodated in the lamp body or a lamp unit coupled to the automobile body is tiltably supported vertically and horizontally by an aiming mechanism, and more particularly to an automobile headlam in which a light source tilting aiming screw turning section is provided outside the lamp body.

2. Related Art

A conventional headlamp of this type is as shown in FIGS. 28 and 29. In the lamp, a reflector 202 to which a light source, namely, light bulb 206 is coupled, is supported by three points, namely, two aiming screws 203 and 204 which extend in a front-to-rear direction through a lamp body 201, and one ball joint 205. FIG. 28 is a front view of the reflector, which shows the aiming screws 203 and 204 extending in a direction perpendicular to the drawing.

The aiming screws 203 and 204 are rotatably supported by the lamp body 201 at the penetrating points. The supporting points of the reflector 202 are provided by nut members 207 and 208 which couple to the reflector 202 and engage with the aiming screws 203 and 204, respectively. The nut members 207 and 208, and the ball joint 105 serving as a swing fulcrum are arranged at right angles as viewed from the front of the lamp.

As the aiming screws 203 and 204 are operated to rotate, the nut members 207 and 108 move back and forth along the screws 203 and 204, while the reflector 202 is inclined about the horizontal axis Lx and the vertical axis Ly, so that the angle of irradiation of the lamp is adjusted vertically and horizontally. The aiming screws 203 and 204 have turning sections 203a at the rear ends which engage with a turning tool such as a screw driver D or a hexagon wrench to turn the screws 203 and 204.

In the above-described conventional headlamp, the turning sections of the aiming screws 203 and 204 expose on the rear side of the lamp body 201. This feature is advantageous as a headlamp used for the European or Japanese standard which requires that a headlamp can incline both vertically and horizontally. However, since the vertically inclining turning section and the horizontally inclining turning section expose outside, the conventional headlamp is disadvantageous as a headlamp for the United States standard which requires that a headlamp can incline only vertically, but it should not incline horizontally.

Hence, in order to adapt the conventional headlamp to the United States standard, it must be modified as follows: The reflector is supported by a ball joint instead of the aiming screw 203. As is apparent from the above description, two different types of headlamps, that is, headlamps to be used for the U.S. standard and headlamps to be used for the European or Japanese standard must be manufactured, although they form one and the same light distribution. This is considerably troublesome, and calls for high in manufacturing cost.

SUMMARY OF THE INVENTION

In view of the foregoing, an object of the invention is to provide an automobile headlamp which has a lamp body which meets different headlamp specifications.

In order to achieve the foregoing object, an automobile headlamp according to the first aspect of the invention includes: a light source unit provided in a lamp body formed of synthetic resin can incline vertically and horizontally by means of an aiming mechanism, and rotating operation sections of a vertical aiming screw and a horizontal aiming screw which forms the aiming mechanism are provided outside of the lamp body, the rotating operation sections being rotated to vertically and horizontally incline the light source unit; wherein a cylindrically protruding wall extends from the lamp body in such a manner as to surround at least the rotating operation section of the horizontal aiming screw, a part of the protruding wall is formed into a tongue-shaped plate which is a lid which is extended through a thing hinge in the same direction as the protruding wall, between the tongue-shaped plate and a protruding wall extending end portion, locking means is provided which holds the tongue-shaped plate bent along the thin hinge in such a manner that the tongue-shaped plate cover the turning section in section protruding wall, and as for a specification which requires no horizontal aiming operation, the tongue-shaped plate is folded down and engaged with the protruding wall extending end portion, to cover the rotating operation section in the protruding wall.

As for a specification that requires a horizontal aiming operation, the tongue-shaped plate serving as a lid extends in the same direction as the protruding wall, and the rotating operation section of the horizonal aiming screw exposes in the protruding wall extending end portion. Hence, with a rotating tool such as a screw driver engaged with the rotating operation section of the horizontal aiming screw through the protruding wall, the rotating operation section can be turned; that is, the light source unit can incline (swing) horizontally.

On the other hand, as for specification that requires no horizontal aiming operation, the lid, or the tongue-shaped plate is folded along the thin hinge in such a manner as to close the protruding wall extending end portion, so that the rotating operation section is covered with the tongue-shaped plate, which makes it impossible to turn the rotating operation section.

In the automobile headlamp, according to a second aspect of the invention, the protruding wall substantially horizontally extends, and the tongue-shaped plate extends in such a manner that the tongue-shaped plate is substantially flush with the upper surface of the protruding wall. Since the tongue-shaped plate is flush with the upper surface of the protruding wall, the protruding wall and the tongue-shaped plate can be formed (molded) with ease.

In the automobile headlamp according to a third aspect of the invention, the locking means is provided between a tongue-shaped plate extending end portion, and is uneven engaging means which functions on the restoring force of the tongue-shaped plate. The elastic force (or restoring force) of the tongue-shaped plate ensures the engagement of the uneven engaging means.

In the automobile headlamp of a fourth aspect of the invention, between the tongue-shaped plate and the protruding wall extending end portion, second locking means is provided which holds the tongue-shaped plate which has been folded along the thin hinge in such a manner that the tongue-shaped plate is laid on the protruding wall. As for a specification that requires the horizontal aiming operation, the lid, or the tongue-shaped plate is folded along the thin hinge, and held laid on the protruding wall. Hence, the tongue-shaped plate does not protrude backwardly, and it does not obstruct the horizontal aiming operation.

In an automobile headlamp in which a light source unit provided in a synthetic resin lamp body can be inclined vertically and horizontally by means of an aiming mechanism, and rotating operation sections of a vertical aiming screw and a horizontal aiming screw which forms the aiming mechanism are provided outside of the lamp body, the rotating operation sections being turned to vertically and horizontally incline the light source unit, according to a fifth aspect of the invention, a protruding wall extends from the lamp body in such a manner as to surround at least the rotating operation section of the horizontal aiming screw, a cap which is a lid adapted to cover a rotating operation section provided in the protruding wall is fixedly press-fitted in a protruding wall extending end portion, and as for a specification which requires no horizontal aiming operation, the cap is press-fitted in the protruding wall extending end portion, to cover the rotating operation section in the protruding wall.

Hence, as for a specification that requires a horizontal aiming operation, the rotating operation section of the horizonal aiming screw exposes in the protruding wall extending end portion. Hence, with a turning tool such as a screw driver engaging with the rotating operation section of the horizontal aiming screw through the protruding wall, the rotating operation section can be turned; that is, the light source unit can incline (swing) horizontally.

On the other hand, as for specification that requires no horizontal aiming operation, the lid, or the cap, is fixedly put on with the protruding wall extending end portion to cover the rotating operation section, which makes it impossible to turn the rotating operation section.

In the automobile headlamp of a sixth aspect of the invention, the protruding wall extends in substantially horizontal direction, the upper portion of the protruding wall is formed into an opening which exposes the rotating operation section in such a manner that the cap is not fixed, while the lower portion of the protruding wall is formed into an opening which functions as a water draining hole. Therefore, in rotating the horizontal aiming screw, the operator can observe the rotating operation section through the opening of the protruding wall from above.

In the automobile headlamp of a seventh aspect of the invention, the outline of the cap is equal to or smaller than the outline of the protruding wall extending end portion. Hence, at the junction of the cap and the protruding wall, the outer cylindrical surface of the cap is flush with the outer cylindrical surface of the protruding wall, or comes inside the outer cylindrical surface of the latter. Hence, the cap scarcely interfere with other components, and it is rather difficult to remove the cap from the protruding wall.

In an automobile headlamp in which a light source unit provided in a synthetic resin lamp body can be inclined vertically and horizontally by means of an aiming mechanism, and rotating operation sections of a vertical aiming screw and a horizontal aiming screw which forms the aiming mechanism are provided outside of the lamp body, the rotating operation sections being turned to vertically and horizontally incline the light source unit, according to an eighth aspect of the invention, a protruding wall is extended from the lamp body in such a manner as to surround at least the rotating operation section of the horizontal aiming screw, as for a specification which requires no horizontal aiming operation, the protruding wall is filled with a seal material to secure the rotating operation section of the horizontal aiming screw to the protruding wall.

Therefore, the seal material filled in the space between the rotating operation section and the protruding wall inhibits the turning of the rotating operation section.

In the automobile headlamp of a ninth aspect of the invention, the rotating operation section of the horizontal aiming screw is covered with the seal material filled in the protruding wall. Hence, the whole turning member is covered with the seal material; that is, it does not expose at all.

According to an automobile headlamp of a tenth aspect of the invention, a light source unit provided in a lamp body formed of a synthetic resin can incline vertically and horizontally by means of an aiming mechanism, and rotation operating sections of a vertical aiming screw and a horizontal aiming screw which form the aiming mechanism are provided outside of the lamp body, the rotation operating sections being rotated to vertically and horizontally incline the light source unit, the automobile headlamp includes a protruding wall extending from the lamp body up to a position beyond each the rotation operating section while surrounding each the rotation operating section, slits are formed at and along corners of portions extending of the protruding wall, while axially extending, whereby tongue-shaped portions are formed between the slits in the extending portion of the protruding wall, and in a specification that requires no rotating operation of the horizontal aiming screw, the tongue-shaped portions are inwardly bent by its thermal deformation to cover each the rotation operating section. With such a structure, the rotation operating section of each aiming screw is covered with portions (tongue-shaped portions) of the protruding wall, which are bent by its thermal deformation. The result is that it is difficult for one to access to the rotation operating sections to turn them.

An eleventh aspect of the invention more specifically defines the automobile headlamp of the tenth aspect described above such that the tongue-shaped portions are confronted with each other with respect to each the rotation operating section. In this structure, the oppositely disposed tongue-shaped portions, when bent, cooperate to cover the rotation operating section.

A twelfth aspect of the invention more specifically defines the automobile headlamp of the tenth and eleventh aspects described above such that of the extending portion of the protruding wall, other portions than the tongue-shaped portions are cut out at and near to the roots of the tongue-shaped portions.

With this technical feature, in an automobile headlamp constructed according to a specification that requires no turn of the horizontal aiming screw, the portion extended rearwardly of the protruding wall is reduced in length.

DESCRIPTION OF THE PREFERRED EMBODIMENTS

Preferred embodiments of the invention will be described with reference to the accompanying drawings:

First Embodiment

Figure 1:
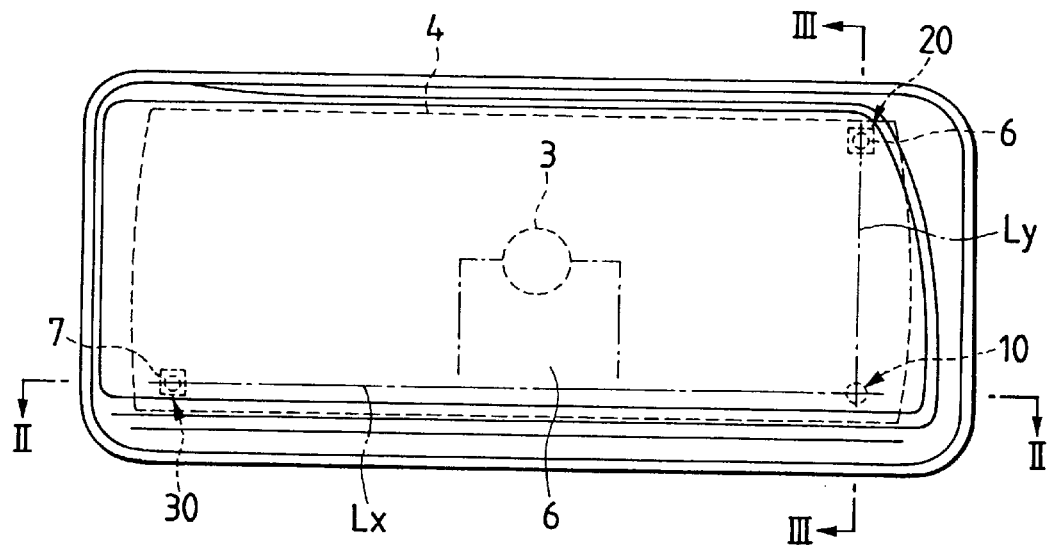
FIG. 1 is a front view of an automobile headlamp, which constitutes a first embodiment of the invention.
Figure 2:
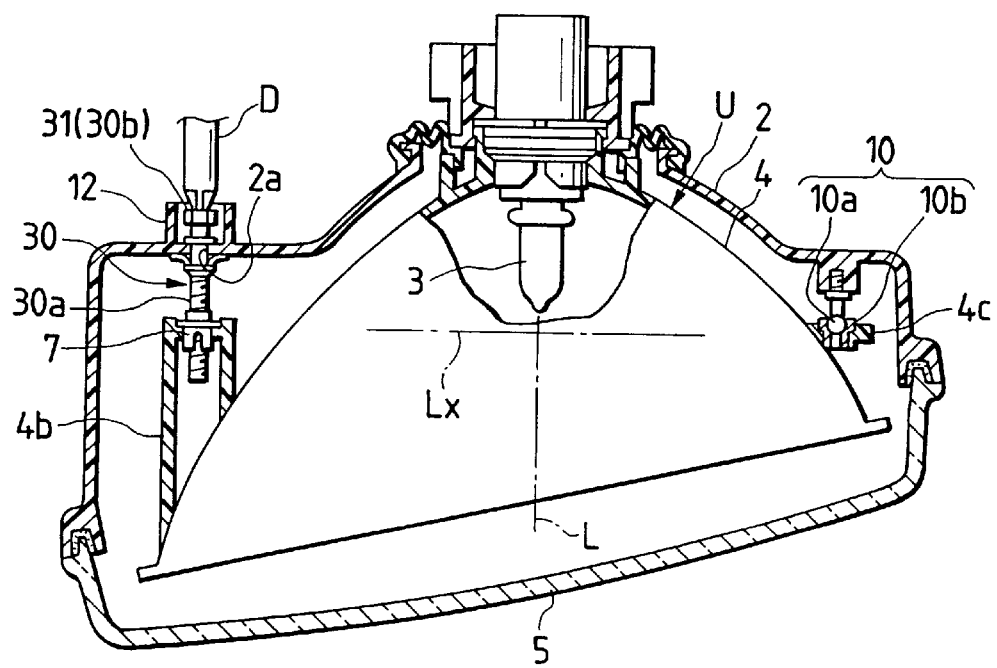
FIG. 2 is a horizontal sectional view taken along line II—II in FIG. 1.
Figure 3:
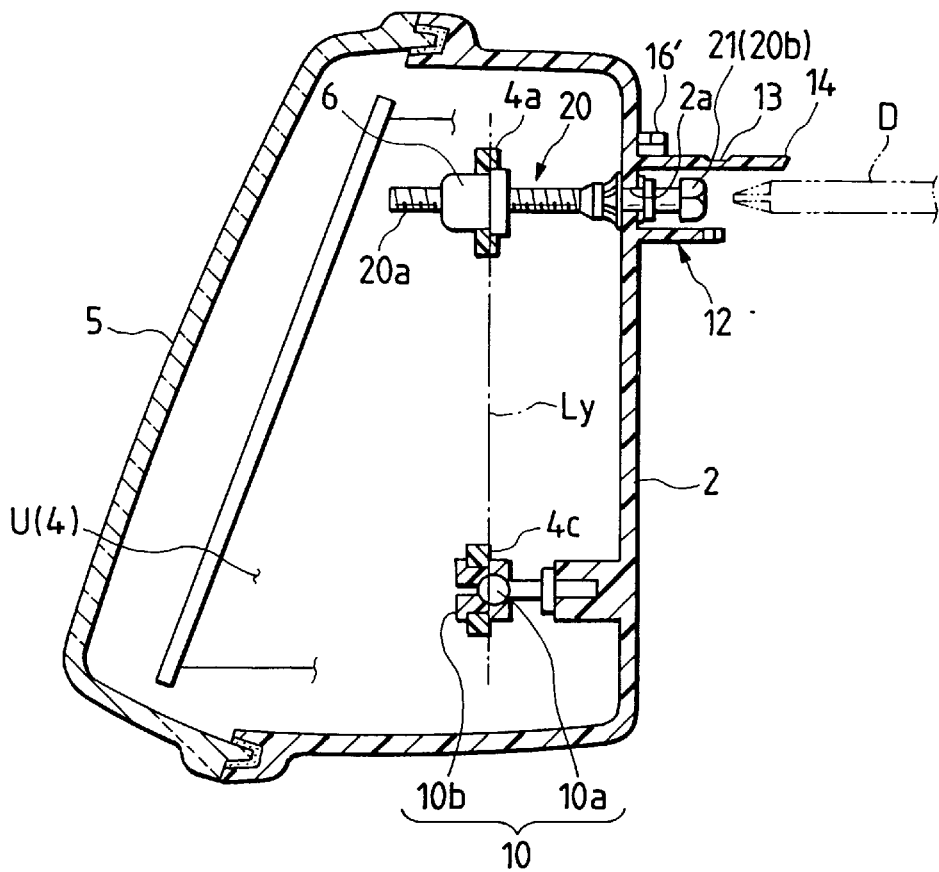
FIG. 3 is a vertical sectional view taken along line III—III in FIG. 1.
Figure 4:
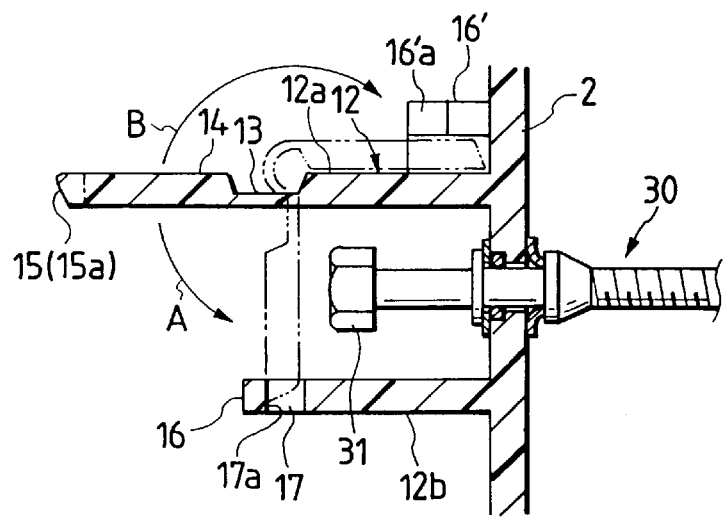
FIG. 4 is a vertical sectional view of a protruding wall which surrounds the rotating operation section of a horizontal aiming screw.

FIGS. 1 through 5 shows an example of an automobile headlamp, which constitutes a first embodiment of the invention. More specifically, FIG. 1 is a front view of the automobile headlamp, the first embodiment of the invention; FIG. 2 is a horizontal sectional view (taken along line II—II in FIG. 1) of the headlamp; FIG. 3 is a vertical sectional view (taken along line III—III in FIG. 1) of the headlamp; FIG. 4 is a vertical sectional view of a protruding wall surrounding the rotating operation section of each of the right and left aiming screws; and FIGS. 5A, 5B and 5C are perspective views of the protruding wall surrounding the rotating operation section of each of the right and left aiming screws—more specifically, FIG. 5A is a perspective view of the protruding wall whose lid is opened halfway or closed halfway; FIG. 5B is a perspective view of the protruding wall whose lid is kept opened; and FIG. 5C is a perspective view of the protruding wall whose lid is kept closed.

In those figures, reference numeral 2 designates a container-shaped lamp body of synthetic resin. A light source unit U (a parabolic reflector 4 with a light source, namely, a light bulb 3) is provided in the lamp body 2, and a front lens 5 engages with the opening of the lamp body 2, thus forming a headlamp.

The light source unit U (the reflector 4) is supported by an aiming mechanism in such a manner that it is tiltable vertically and horizontally. The aiming mechanism is made up of: a pair of aiming screws 20 and 30 which extends through screw inserting holes 2a in a front-to-rear direction and in a rear-to-front direction; nut members 6 and 7 which are fitted in brackets 4a and 4b protruded from the rear surface of the reflector 4 and engaged with the aiming screws 20 and 30; and a ball joint 10 interposed between the reflector 4 and the lamp body 2.

The ball joint 10 comprises: a ball 10a protruded towards the lamp body; and a ball receiver 10b which is fitted in a bracket 4c protruded from the rear surface of the reflector 4, and supports the ball 10a. On the other hand, the aiming screws 20 and 30 are rotatably supported in the screw inserting holes 2a of the lamp body 2. The nuts 6 and 7 are threadably engaged with screw threaded portions 20a and 30a which are extended forwardly, and screw rear end portions 20b and 30b have rotating operation sections 21 and 31 with which the tooth of a screw driver D is engageable.

As the rotating operation sections 21 and 31 (the aiming screws 20 and 30) are turned with the screw driver D, the nut members 6 and 7 are moved back and forth along the screw threaded portions 20a and 30a, so that the light source unit U (the reflector 4) is tilted vertically and horizontally. That is, the aiming screw 20 is a vertical aiming screw which turns the light source unit U about the horizontal axis Lx (connecting the nut member 7 and the ball joint 10) (rotating it vertically); and the aiming screw 30 is a horizontal aiming screw which turns the light source unit U about the vertical axis Ly (connecting the nut member 6 and the ball joint 10) (rotating it horizontally).

At the positions where the horizontal aiming screw 30 and the vertical aiming screw 20 of the lamp body 2, the protruding walls 12 extend backwardly in such a manner as to surround the screw rear end portions 20b and 30b. Each of the protruding walls 12 is formed as follows: The upper region (or the upper wall 12a) of the protruding wall 12 is flat and horizontal, and the region which is below and beside the screw and (the lower wall, and the right and left side walls 12c and 12d) are arcuate.

A tongue-shaped plate 14 is integral though a belt-shaped thin hinge 13 (which is extended horizontal) with the outer end of the upper wall 12a in such a manner that the tongue-shaped plate 14 is flush with the upper wall 12a. That is, the protruding wall 12, the thin hinge 13, and the tongue-shaped plate 14 are integral with the lamp body 2, and the tongue-shaped plate 14 is swingable (bendable) through the elastic deformation of the thin hinge 13.

The size of the tongue-shaped plate is so shaped that it just meets the extended end of the protruding wall 12 (or the opening of the latter 12). That tongue-shaped plate 14 has a locking protrusion 15 at the front end. On the other hand, the lower wall 12b of the protruding wall 12 has a front protrusion 16 at the front end which has a locking hole 17 with which the locking protrusion 15 engages.

That is, when the tongue-shaped plate 14 is bent downwardly along the thin hinge 13 so that it is pushed into the opening of the protruding wall 12, the locking protrusion 15 of the tongue-shaped plate 14 abuts against the front edge of the protrusion 16. In this operation, those parts 15 and 16 are mutually deformed by each other, so that the locking protrusion 15 is engaged with the locking hole 17; that is, the tongue-shaped plate 14 is locked to the opening of the protruding wall 12. The locking protrusion 15 has a sloped surface at the end so that the locking protrusion 15 smoothly engages with the locking hole 17.

Under the condition that the locking protrusion 15 has been engaged with the locking hole 17, the restoring force of the thin hinge which has been bent pushes the locking protrusion 15 against the side surface 17c of the locking hole 17. Hence, the tongue-shaped plate 14 is not vibrated, and closes the extended end (the opening) of the protruding wall 12. That is, the swinging section 31 in the protruding wall 12 is covered with the protruding wall 12 and the tongue-shaped plate 14.

The tongue-shaped plate 14 has a pair of arcuate locking protrusions 15' on both sides of the locking protrusion 15 formed at the front end. On the other hand, the extending base of the protruding wall's upper wall 12a has a pair of locking hooks 16' L-shaped in section at right and left ends so that the locking hooks 16 engages with the arcuate locking protrusions 15'.

That is, when, as indicated by the arrow B in FIG. 4, the tongue-shaped plate 14 is bent along the thing hinge 3 so that the locking protrusions 15' are pushed against the locking hooks 16, then the locking protrusions 15' (the tongue-shaped plate 14 and the thin hinge 13) and the locking hooks 16 are mutually elastically deformed, so that the locking protrusions 15' slide on locking hook introducing sections 16'a. As a result, the locking hooks 15' engage with the locking hooks 16; that is, the tongue-shaped plate 14 is laid on the upper wall 12a of the protruding wall. Even under the condition that the locking protrusion 15' have been engaged with the locking hooks 16', the locking protrusions 15' are kept engaged with the locking hooks 16' by the restoring force of the thing hinge 13 which is bent, and therefore the tongue-shaped plate 14 will not be vibrated. The outer edges of the locking protrusions 15 are formed into sloped surfaces 15'a so that the locking protrusions 15 are smoothly engaged with the locking hooks 16'.

Figure 5A:
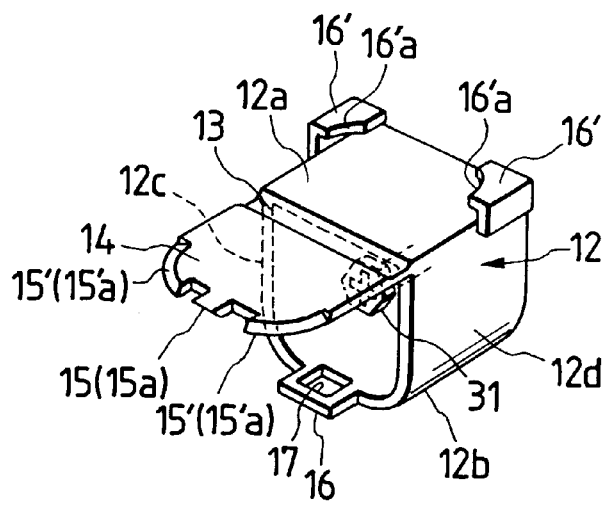
FIG. 5A is a perspective view of the protruding wall whose lid is not opened nor closed.
Figure 5B:
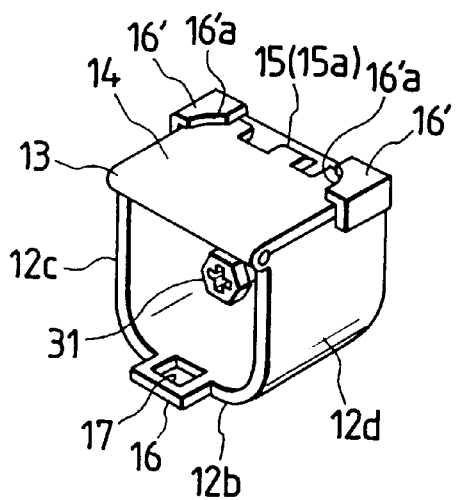
FIG. 5B is a perspective view of the protruding wall whose lid is held open.

Hence, in the case of a specification that, as in the specification for a headlamp to be used for the Japanese or European standard, the vertical aiming screw and the horizontal aiming screw are turned, the tongue-shaped plates 14 for the rotating operation section 21 and 31 as shown in FIG. 5B. That is, with a screw driver, the rotating operation section 21 and 31 can be turned to incline the optical axis of the head lamp vertically and horizontally.

Each of the tongue-shaped plates 14 (the lids) is folded, and held laid on the upper wall 12 by the locking means comprising the locking protrusions 15' and the locking hooks 16'. Therefore, the tongue-shaped plates 14 will not obstruct the aiming operation.

Figure 5C:
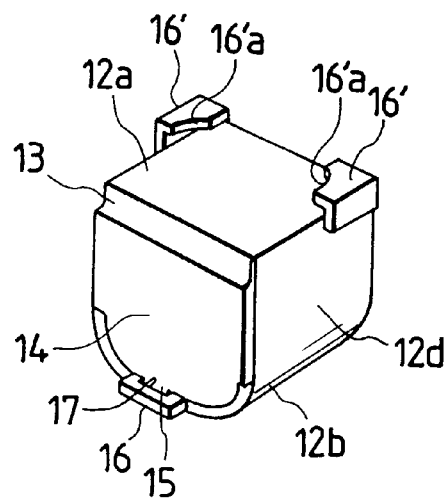
FIG. 5C is a perspective view of the protruding wall whose lid is held closed.

On the other hand, in the case of a specification that, as in the specification for a head lamp for the United States standard, the horizontal aiming screw shall not be turned, the lid for the rotating operation section 21 is kept open as shown in FIG. 5B, while the tongue-shaped plate 14 serving as a lid for the rotating operation section 31 is closed as shown in FIG. 5C. In this case, the rotating operation section 21 can be turned with a screw driver, but the rotating operation section 21 cannot be turned. That is, the optical axis of the head lamp can tilt vertically.

Figure 6:
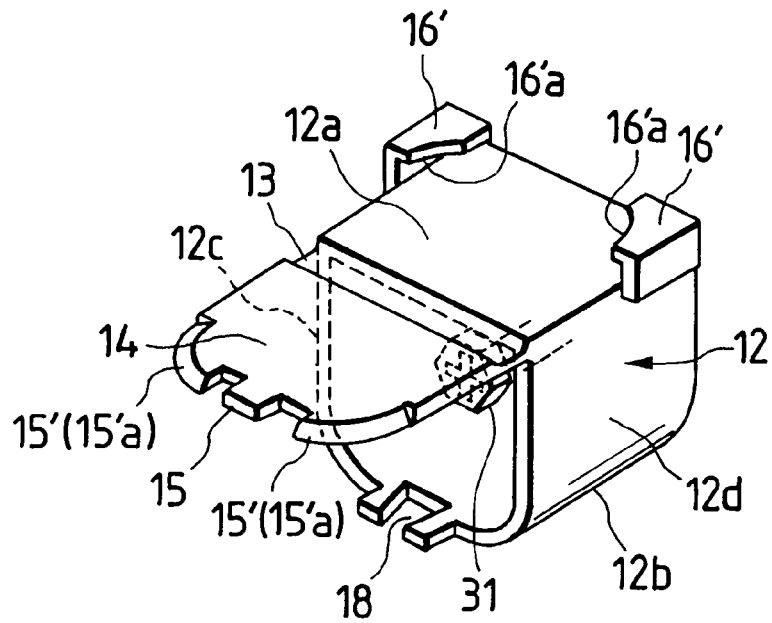
FIG. 6 is a perspective view showing other locking means of the lid (or tongue-shaped plate) to the opening of the protruding wall.

The locking means for locking the tongue-shaped plate so that the opening of the protruding wall 12 is closed, may be modified as follows: Instead of the locking hole 17, a U-shaped cut 18 may be employed as shown in FIG. 6 which is gradually larger in width inwardly.

Furthermore, the means for holding the tongue-shaped plate (the lid) 14 open or closed is not limited to what has been described above; that is, it may be freely modified as long as it is provided between the tongue-shaped plate 14 and the protruding wall, and it is an uneven locking section which is able to lock the tongue-shaped plate 14 against the restoring force of the thin hinge 13 with the tongue-shaped plate 14 bent or folded.

Second Embodiment

Figure 7:
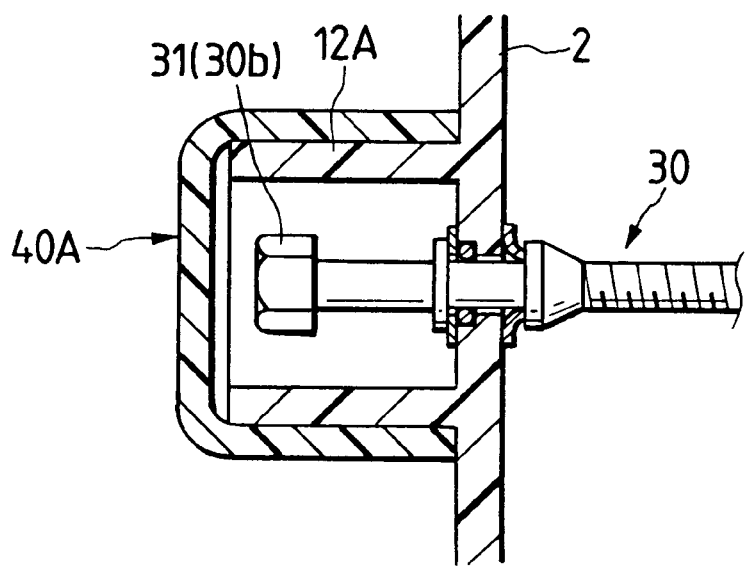
FIG. 7 is a vertical sectional view of a protruding wall surrounding the rotating operation section of a horizontal aiming screw which is an essential component of a second embodiment of the invention.

FIG. 7 is a vertical sectional view of a protruding wall surrounding the rotating operation section of a horizontal aiming screw which is an essential component of a second embodiment of the invention.

In the second embodiment, a protruding wall 12 is extended from the lamp body 2 in such a manner that it surrounds the rotating operation section of the horizontal aiming screw 30. For a specification that the horizontal aiming operation is inhibited, a lid, or a cap 40A is put on the protruding wall 12A, to close the opening of the latter 12A.

When the lid (or the cap 40A) has been on the protruding wall 12A, the lid is in close contact with the outer cylindrical surface of the protruding wall 12A, and extends to the root of the latter 12A. Hence, the frictional force of the lid and the protruding wall is so great that the lid is rather not removable.

Third Embodiment

Figure 8:
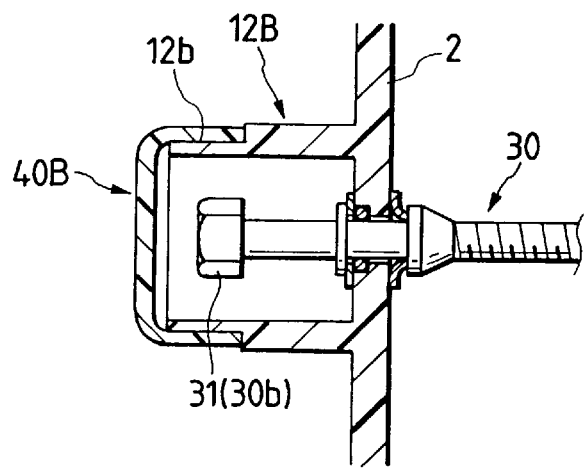
FIG. 8 is a vertical sectional view of a protruding wall surrounding the rotating operation section of a horizontal aiming screw which is an essential component of a third embodiment of the invention.

FIG. 8 is a vertical sectional view of a protruding wall surrounding the rotating operation section of a horizontal aiming screw which is an essential component of the third embodiment of the invention.

In the embodiment, the outer end portion of the protruding wall 12B surrounding the rotating operation section 31 is stepped inwardly, thus forming a lid engaging section 12b, and a cap 40B is fixedly put on the lid engaging section 12b, so that the rotating operation section 31 of the horizontal aiming screwing 30 is covered with the cap 40B.

In the case where the outside diameter of the cap 40B is slightly smaller than the outside diameter of the base of the protruding wall 12B, and the cap 40B is fixedly put on the protruding wall 12B, since the outer cylindrical surface of the protruding wall 12B expands outwardly more than the outer cylindrical surface of the cap 40B the latter 40B does not interfere with other members; that is, the cap 40B is not substantially dropped off the protruding wall.

Fourth Embodiment

Figure 9:
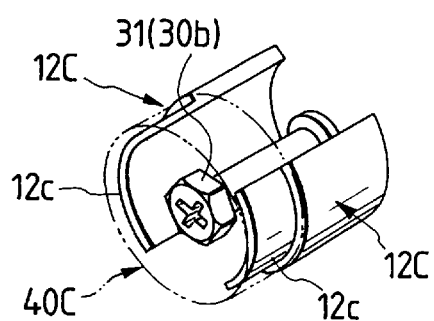
FIG. 9 is a vertical sectional view of a protruding wall surrounding the rotating operation section of a horizontal aiming screw which is an essential component of a fourth embodiment of the invention.

FIG. 9 is a perspective view of a pair of protruding walls surrounding the rotating operation section of a horizontal aiming screw which is an essential component of the fourth embodiment of the invention.

In the embodiment, unlike the above-described embodiments, a pair of protruding walls 12C are provided which are obtained by the upper portion and the lower portion of the above-described protruding wall extends in such a manner as to surround the rotating operation section 31 of the horizontal aiming screw. Similarly, as in the third embodiment, the outer end portions of the pair of protruding walls 12C are stepped inwardly, thus forming a pair of lid engaging sections 12c. A cap 40C is fixedly put on the lid engaging sections 12c, that is, the rotating operation section 31 of the aiming screw is covered with the cap 40C.

When the cap 40C is fixedly put on the protruding walls 12C, the outer cylindrical surface of the cap 40 is flush with the outer cylindrical surfaces of the protruding walls 12C or comes inside the outer cylindrical surfaces of the protruding walls 12C; that is, the cap 40C is scarcely removed from the protruding walls 12C.

In the embodiment, the protruding walls 12C define the upper opening. Hence, where the cap 40C is not put on the protruding walls 12C (as in the case of a specification for a headlamp to be used in Europe or Japan), since the rotating operation section 31 can be seen from above the head lamp the screw driver can readily engage with the rotating operation section 31 to rotate the aiming screw 30; that is, the adjustment of the latter 30 can be readily achieved as much.

In addition the protruding wall 12C defines the lower opening. Hence, water entering the inside of the protruding wall 12, is discharged from the lower opening; that is, no water is stored inside the protruding wall.

In the above-described fourth embodiment, the protruding wall surrounding the rotating operation section 31 is made up of a pair of right and left walls which are obtained by cutting the upper portion and the lower portion of a protruding wall from top to bottom; however, the invention is not limited thereto or thereby. That is, the same effect may be obtained by cutting the upper and lower portions of the protruding wall on the extended end side.

Fifth and Sixth Embodiments

Figure 10:
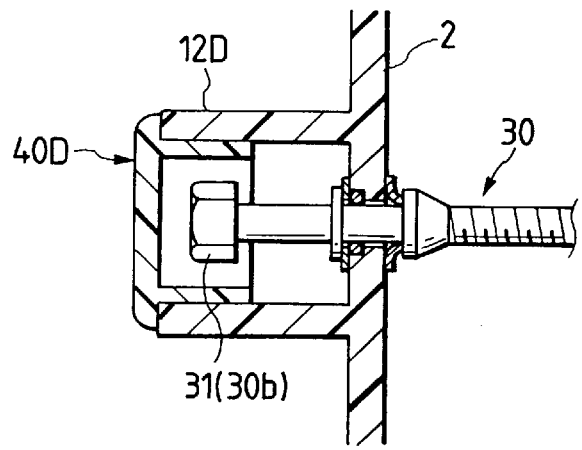
FIG. 10 is a vertical sectional view of a protruding wall surrounding the rotating operation section of a horizontal aiming screw which is an essential component of a fifth embodiment of the invention.
Figure 11:
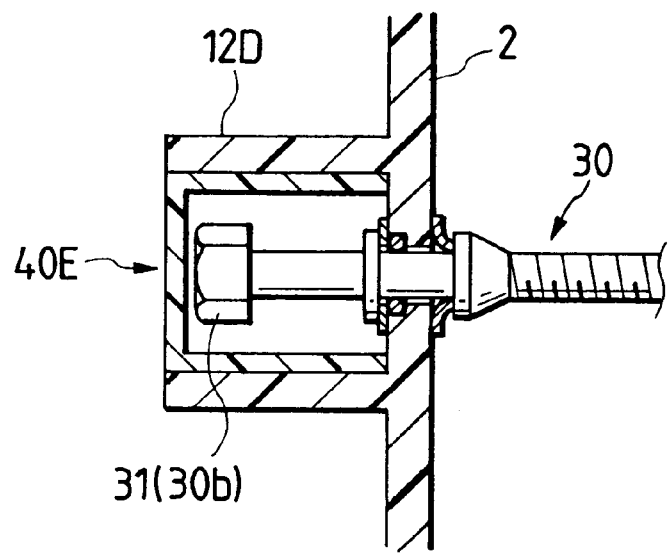
FIG. 11 is a vertical sectional view of a protruding wall surrounding the rotating operation section of a horizontal aiming screw which is an essential component of a sixth embodiment of the invention.

FIGS. 10 and 11 are vertical sectional views showing protruding walls surrounding the rotating operation sections of horizontal aiming screws which are essential parts of fifth and sixth embodiments of the invention, respectively.

In the above-described second through fourth embodiments of the invention, the cap is fixedly put on the protruding wall. On the other hand, in the fifth and six embodiments, a cap 40D is pressed fitted in the protruding wall.

In the fifth embodiment (cf. FIG. 10), the outside diameter of the cap 40D is slightly smaller than the outside diameter of the protruding wall 12D, so that the cap 40D press-fitted in the protruding wall 12D is scarcely removed from the latter 12D.

In the sixth embodiment (cf. FIG. 11), the outer end face of the cap 40E press-fitted in the protruding wall 12D is flushed with the front (outer) end face of the latter 12D or set back deep in the protruding wall 12D. Hence, it is difficult to remove the cap 40E from the protruding wall 12D.

Seventh and Eighth Embodiments

Figure 12:
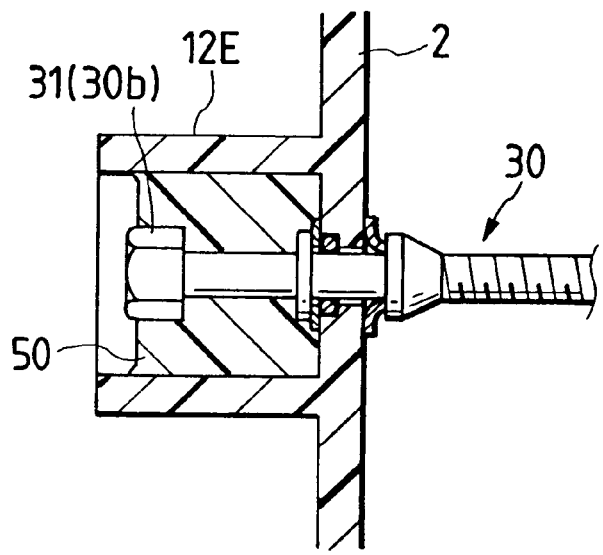
FIG. 12 is a vertical sectional view of a protruding wall surrounding the rotating operation section of a horizontal aiming screw which is an essential component of a seventh embodiment of the invention.
Figure 13:
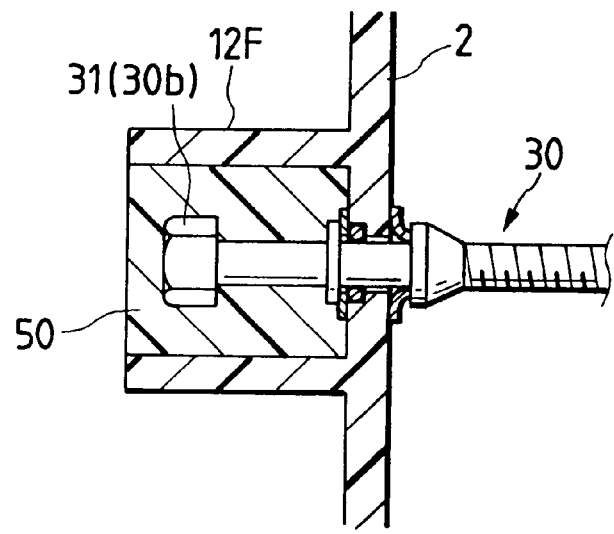
FIG. 13 is a vertical sectional view of a protruding wall surrounding the rotating operation section of a horizontal aiming screw which is an essential component of an eighth embodiment of the invention.

FIGS. 12 and 13 are vertical sectional views showing protruding walls surround the rotating operation sections of horizontal aiming screws which are essential parts of seventh and eighth embodiments of the invention, respectively.

In the second through sixth embodiments, the rotating operation section of the aiming screw is covered with the cap in the case of a specification that the horizontal aiming screw shall not be rotated. On the other hand, in the seventh and eighth embodiments of the invention, the protruding wall 12 is filled with a seal material 50, to inhibit the rotation of the aiming screw 30.

In the seventh embodiment (cf. FIG. 12), a hexagonal head bolt-shaped rotating operation section 31 is made integral with the protruding wall 12E with a seal material 50, so that the it is difficult to rotate the aiming screw 30.

In the seventh embodiment, the outer end face of the rotating operation section 31 is exposed from the layer of seal material 50. On the other hand, in the eighth embodiment (cf. FIG. 13), the protruding wall is filled with a seal material 50 so that the rotating operation section 31 is covered with the latter 50; that is, the rotating operation section 3 is buried in the seal material 50 filled in the protruding wall 12F, to positively prevent the rotation of the aiming screw 30.

Ninth Embodiment

Figure 14:
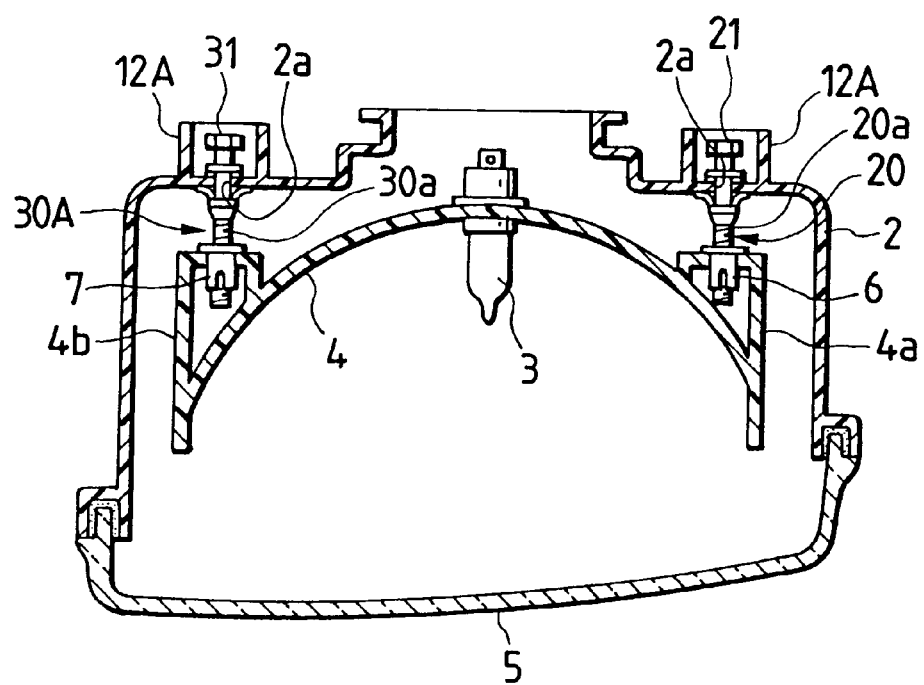
FIG. 14 is a horizontal sectional view of an automobile headlamp, which constitutes a ninth embodiment of the invention.
Figure 15:
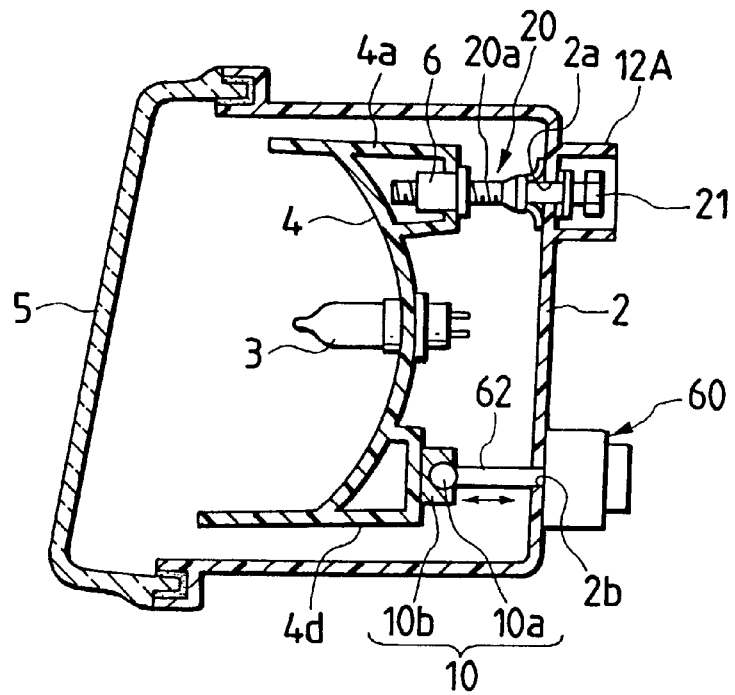
FIG. 15 is a vertical section view of the automobile headlamp, the ninth embodiment of the invention.
Figure 16:
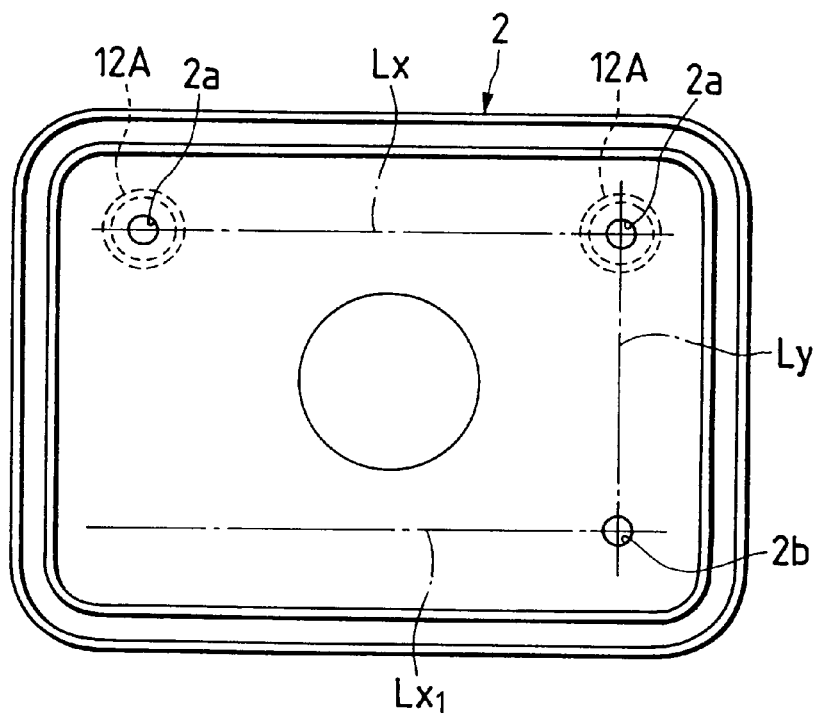
FIG. 16 is a front view of a lamp body of the headlamp, the ninth embodiment of the invention.

FIGS. 14, 15 and 16 show an automobile headlamp, which constitutes a ninth embodiment of the invention. FIG. 14 is a horizontal sectional view of the headlamp, FIG. 15 is a vertical sectional view of the headlamp, and FIG. 16 is a front view of a lamp body which is a part of the headlamp.

A light source unit U (a reflector 4) is vertically and horizontally inclined by means of an aiming mechanism. The latter comprises: a pair of aiming screws 20 and 30A which extend in a front-to-rear direction (horizontally) through screw inserting holes 2a formed in the back wall of the lamp body 2; nut members 6 and 7 which are fitted in brackets 4a and 4b protruded from the rear wall of the reflector 4, and are engaged with screw threaded portions 20a and 30a; and a ball joint 10 which is the inclining fulcrum.

The arrangement of the aiming screws 20 and 30A, and the nut members 6 and 7 engaged with the screw threaded portions 20a and 30a are equal to that of the aiming screws and the nut members of the aiming mechanism in the above-described first embodiment; that is, in the ninth embodiment, parts of the aiming mechanism which correspond functionally to those already described with reference to the aiming mechanism of the first embodiment are therefore designated by the same reference numerals or characters.

The ball joint 10 is made up of a ball 10a formed on the top of the movable rod 62 of a leveling actuator 60, and a ball receiver 10b fitted in a reflector-side bracket 4d. The movable rod 62 of the actuator 60 extends forwardly through a rod inserting hole 2b formed in the lamp body 2. The actuator operates as follows: In response to a signal, for instance, from a gravity center movement detecting sensor (adapted to detect the forward and backward movements of the gravity center of an automobile), the actuator 60 moves the movable rod back and forth, thereby to move the position of the ball joint 10 (which is the inclination fulcrum) back and forth. That is, in response to the forward and backward movement of the position of the gravity center of the automobile, the actuator 60 moves the position of the ball joint 10 back and forth, whereby the light source unit U is turned about the horizontal axis Lx connecting the nut member 6 and the nut member 7; that is, the optical axis of the head lamp is maintained unchanged in posture.

As the aiming screws 20 and 30A are turned, the nut members 6 and 7 are moved back and forth. Hence, by turning the aiming screws 20 and 30A, the light source unit U can be turned about the horizontal axis $Lx_1$ passing through the ball joint 10. That is, the aiming screws 20 and 30A are vertical aiming screws which cooperate with each other to incline the light source unit U vertically.

The above-described embodiment may be employed as a head lamp with an automatic leveling function to be used in Europe or Japan which can manually incline the reflector vertically and horizontally (the vertically and horizontally aiming operations).

Protruding walls 12A are formed in such a manner as to surround the aiming screws 20 and 30, respectively. Caps 40A (cf. FIG. 7) are fixedly put on the protruding wall 12A, to cover the rotating operation sections 21 and 31 of the aiming screws 20 and 30A. And instead of the leveling actuator 60 and the ball joint 10, the aiming screws and the nut members are employed to obtain a headlamp as shown in FIGS. 17 and 18 which are different in specification from the above-described one.

Tenth Embodiment

Figure 17:
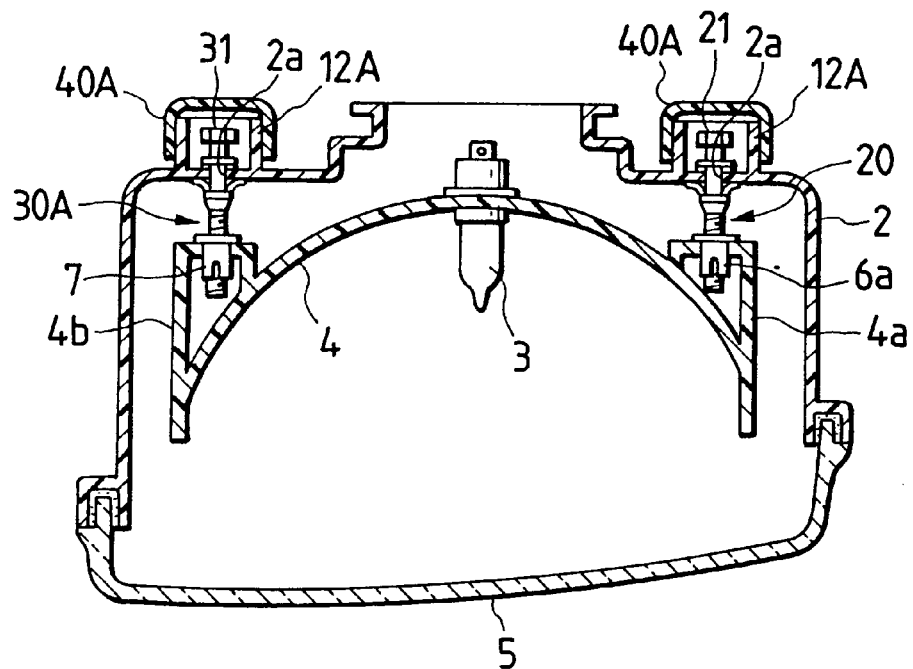
FIG. 17 is a horizontal sectional view of an automobile headlamp, which constitutes a tenth embodiment of the invention.
Figure 18:
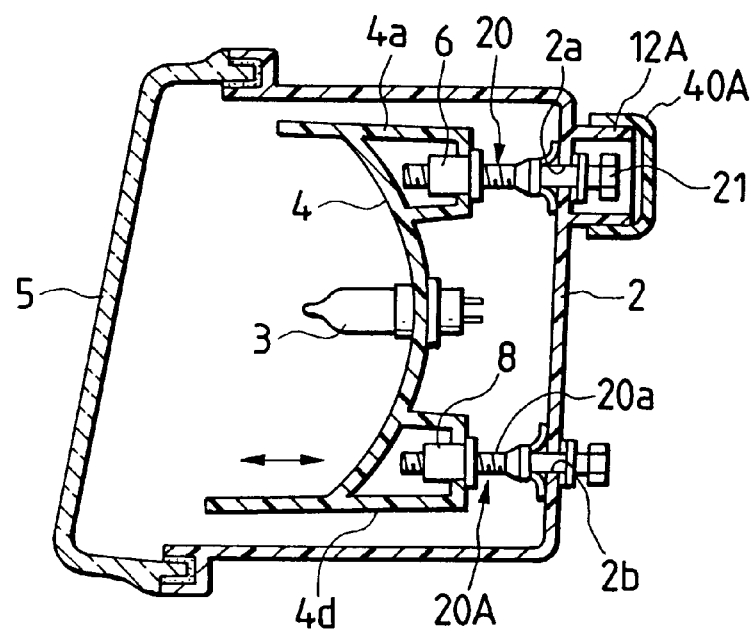
FIG. 18 is a vertical sectional view of the headlamp, the tenth embodiment.

FIGS. 17 and 18 show an automobile headlamp, which constitutes a tenth embodiment of the invention. More specifically, FIG. 17 is a horizontal sectional view of the head lamp, and FIG. 18 is a vertical sectional view of the head lamp.

The tenth embodiment is different from the ninth embodiment (FIGS. 14 through 16) only in the aiming specification, and is adapted to the United States standard.

That is, an aiming screw 20A is rotatably supported in a rod inserting hole 2b formed in the lamp body 2 (in a hole in which the movable rod 62 of the leveling actuator 60 is inserted, in the case of the headlamp to be used in Europe or Japan); and the nut member 8 fitted in a reflector-side bracket 4d engages with the screw threaded portion 20A. Hence, as the aiming screw 20A is rotated, the light source unit U is inclined about the horizontal axis Lx (cf. FIG. 16) connecting the nut members 6 and 7.

At the positions of the aiming screws 20 and 30A of the lamp body 1, protruding walls 12A and 12A are formed in such a manner as to surround the rotating operation sections 21 and 31, respectively. Caps 40A fixedly engage with the protruding walls 12A, to inhibit the turning of the aiming screw; that is, the headlamp is adapted to the United States standard.

The above-described embodiments are automobile head lamps; however, the invention is not limited thereto or thereby. That is, the technical concept of the invention may be applied to fog lamps and other automobiles headlamps.

Figure 19:
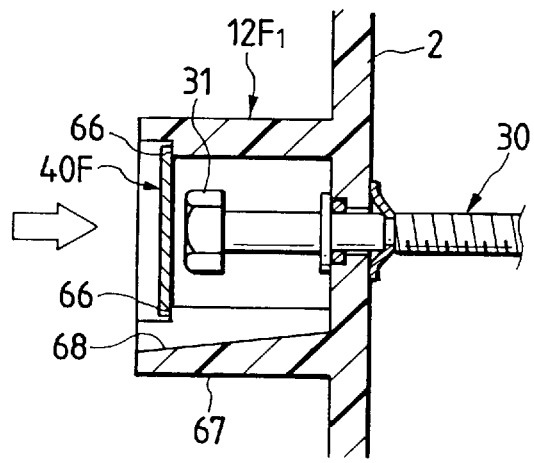
FIG. 19 is a longitudinal sectional view showing a protruding wall surrounding the rotation operating section of each of the right and left aiming screws as a key portion of an eleventh embodiment of the present invention.
Figure 20:
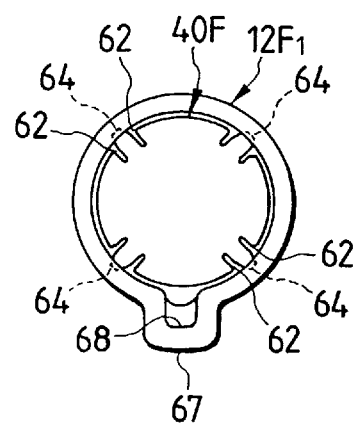
FIG. 20 is a front view showing the protruding wall illustrated in FIG. 19.
Figure 21:
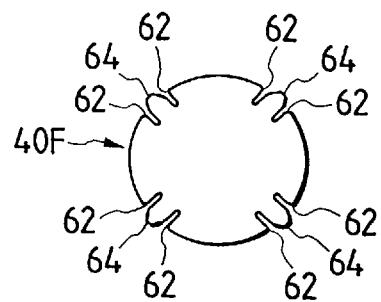
FIG. 21 is a front view showing a cap press fit to the protruding wall.

FIGS. 19 through 21 cooperatively show a key portion of an eleventh embodiment of the present invention. Of those figures, FIG. 19 is a longitudinal sectional view showing a protruding wall surrounding each of the rotation operating sections of the right and left aiming screws as a key portion of an eleventh embodiment of the present invention. FIG. 20 is a front view showing the protruding wall illustrated in FIG. 19. FIG. 21 is a front view showing a cap press fit to the protruding wall.

As described above, the lids or caps 40A, 40B, 40C, 40D and 40E in the second to sixth embodiments that have each such a structure that the outer cylindrical portion is extended from the circumferential edge of the ceiling plate. The inner surface of the outer cylindrical portion is brought into close contact with the outer surface of the protruding wall, viz., the outer cylindrical portion is press fit to the protruding wall. With this, the cap is rather not removable. In the eleventh embodiment of the invention which follows, the cap is substituted by a disc-like member 40F made of synthetic resin or metal. The disc-like member is press fit into the upper part of the inner wall of the protruding wall 12F1.

As shown, pawls 64 are protruded at four positions along the circumference of the disc-like member 40F while each pawl is located between slits 62. A stepped part 66 is formed along the inner circumferential edge of the opening defined by the protruding wall 12F1. The diameter of the stepped part 66 corresponds to the outside diameter of the disc-like member 40F (more exactly, the outside diameter oft he disc-like member 40F except the height of each pawl 64). The disc-like member 40F is forcibly put into the opening of the protruding wall 12F1 as indicated by an arrow in FIG. 19. The pawls 64 are pressed against the inner circumferential wall of the protruding wall 12F1, while being elastically deformed. As a result, the disc-like member 40F is put into the protruding wall 12F1 till it is abutted against the stepped part 66 of the protruding wall 12F1. In this state, the tips of the pawls 64 are bitten into the surface region of the inner surface of the protruding wall 12F1 made of synthetic resin. The result is that the disc-like member 40F are held immovably therein while covering the rotation operating section 31 of the aiming screw.

A protruded portion 67 having therein a drain groove 68 is provided at the bottom of the protruding wall 12F1. The drain groove 68 is slanted downward to the edge of the opening of the protruding wall. Therefore, water naturally flows out of the protruding wall.

Provision of the protruded portion 67 makes the protruding wall 12F1 entirely continuous over its entire circumference. Therefore, a rigidity of the protruding wall is high. In a case where a drain slit is longitudinally formed in and along the inner surface of the lower side of the protruding wall, some problems arise. A first problem is that a rigidity of the protruding wall is low. A second problem is that the protruding wall is easy to be deformed and hence, an amount of biting of each pawl 64 into the inner surface of the protruding wall is correspondingly reduced. Therefore, the slip-out impeding ability of the structure including the disc-like member 40F and the protruding wall will possibly be lessened. In this respect, it is noted that in this embodiment, the drain groove 68 is formed within the protruded portion 67 which is continuous in configuration to the protruding wall 12F1. Therefore, there is no chance that the rigidity of the protruding wall 12F1 is lessened and that the amount of biting of the pawls into the inner surface of the protruding wall is reduced. The disc-like member 40F press fit into the protruding wall 12F1 is reliably held within the protruding wall, viz., the structure fully exhibits its slip-out impeding ability.

The drain groove 68 may also be used to remove the disc-like member 40F from the protruding wall. In this case, a tool, e.g., a driver, is inserted into the drain groove 68 and to raise the disc.

Figure 22:
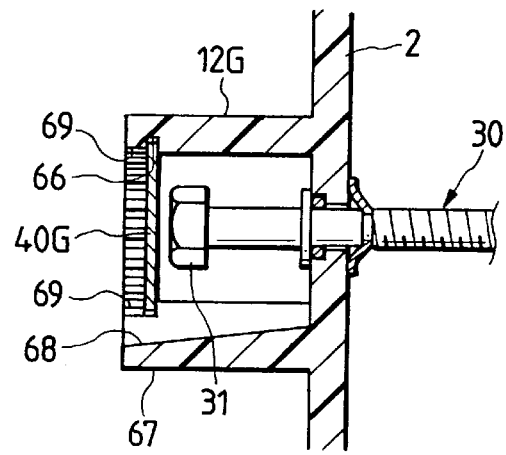
FIG. 22 is a longitudinal sectional view showing a protruding wall surrounding each of the rotation operating sections of the right and left aiming screws as a key portion of a twelfth embodiment of the present invention.
Figure 23:
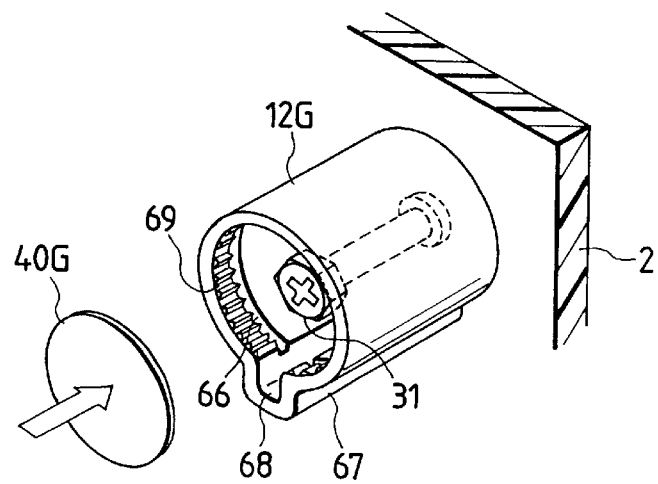
FIG. 23 is a perspective view showing the protruding wall illustrated in FIG. 22.

FIGS. 22 and 23 cooperatively show a twelfth embodiment of the present invention. Of those figures, FIG. 22 is a longitudinal sectional view showing a protruding wall surrounding each of the rotation operating sections of the right and left aiming screws as a key portion of a twelfth embodiment of the present invention. FIG. 23 is a perspective view showing the protruding wall illustrated in FIG. 22.

In the construction of the eleventh embodiment, the pawls 64 of the disc-like member 40F bite into the inner surface of the protruding wall 12F1, whereby the disc-like member 40F are prevented from slipping out of the protruding wall 12F1. In the twelfth embodiment to follow, elongated protrusions are provided on a protruding wall 12G. The elongated protrusions prevents a disc-like member 40G from slipping off from the protruding wall.

To be more specific, elongated protrusions 69, while being axially extended, are equidistantly provided on and along the inner surface of the protruding wall 12G, which is closer to the opening of the same. A configuration of the protruding wall 12G is the same as of the protruding wall 12F1. When the disc-like member 40G is press fit into the protruding wall 12G, the disc-like member 40G progresses while cutting the elongated protrusions 69. Therefore, a small force is required to press fit the disc-like member 40G into the protruding wall 12G. The press-fit disc-like member 40G has bit into the elongated protrusions 69 on the inner surface of the protruding wall 12G, and it is locked in the cylindrical walls 12 in this state.

The remaining construction of the twelfth embodiment is the same as of the eleventh embodiment. Hence, no further description of it will be given, and like reference numerals are used for designating like portions in the eleventh embodiment.

Figure 24:
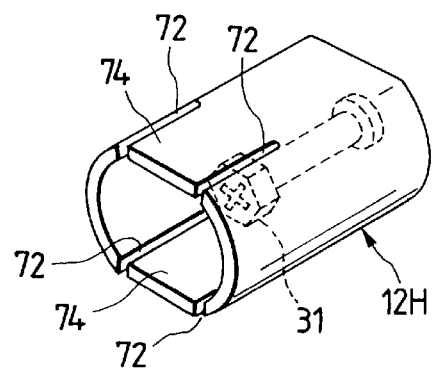
FIG. 24 is a longitudinal sectional view showing a protruding wall surrounding each of the rotation operating sections of the right and left aiming screws as a key portion of a thirteenth embodiment of the present invention.
Figure 25:
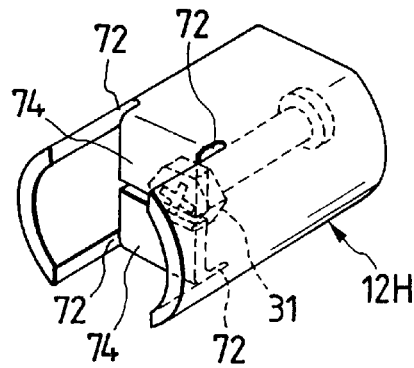
FIG. 25 is a perspective view showing the protruding wall shown in FIG. 24, which is illustrated covering the rotation operating section by thermally deforming a part of the protruding wall.
Figure 26:
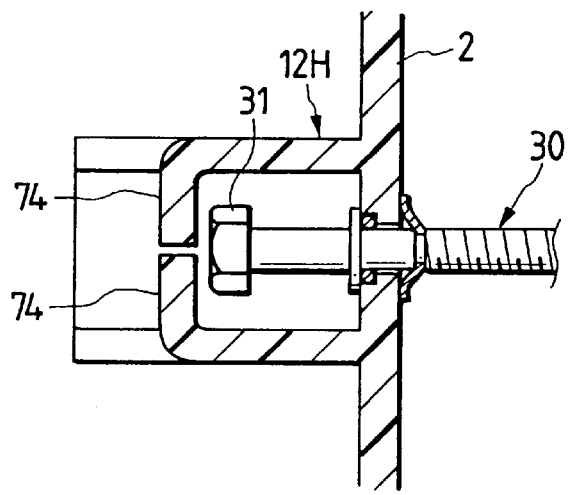
FIG. 26 is a longitudinal sectional view showing the protruding wall of FIG. 25.

FIGS. 24 through 26 cooperatively show a key portion of a thirteenth embodiment of the present invention. Of those figures, FIG. 24 is a longitudinal sectional view showing a protruding wall surrounding each of the rotation operating sections of the right and left aiming screws as a key portion of a thirteenth embodiment of the present invention. FIG. 25 is a perspective view showing the protruding wall shown in FIG. 24, which is illustrated covering the rotation operating section by thermally deforming a part of the protruding wall. FIG. 26 is a longitudinal sectional view showing the protruding wall of FIG. 25.

As shown, a protruding wall 12H surrounds the rotation operating section 31. The cylindrical wall is made of thermoplastic resin. Right and left side walls of the protruding wall 12H are arcuate in shape, and the upper and lower side walls thereof are planar. Therefore, the protruding wall 12H is substantially rectangular in cross section. Those side walls are extended rearward beyond the rotation operating section 31. Slits 72 that axially extend are provided on both sides of each of the upper and lower side walls, which are flat and extended rearward, to thereby form tongue-shaped portions 74 confronted with each other. Those tongue-shaped portions 74 are each wider than the outside diameter of the rotation operating section 31.

A specification that requires no turn of the aiming screw 30 may be satisfied in a manner that the roots of the tongue-shaped portions 74 are softened by driving a hot air thereupon by a blower, for example, and bent to cover the rotation operating section 31 with the bent tongue-shaped portions 74 as shown in FIGS. 25 and 26.

Bending of only one of the tongue-shaped portions 74 makes it possible to cover the rotation operating section 31. However, the approach of the present embodiment in which two tongue-shaped portions 74 are confronted with each other and bent so that the tips of the tongue-shaped portions 74 are brought face-to-face with each other is advantageous in that the rearward extended portions, i.e., the tongue-shaped portions, of the protruding wall 12H are shorter than in the case using a single tongue-shaped portion 74.

Figure 27:
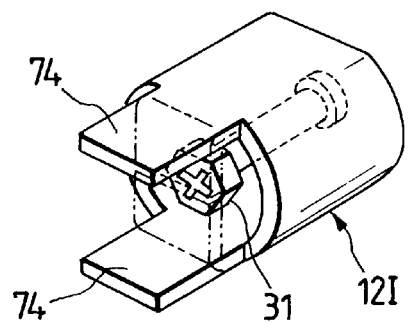
FIG. 27 is a longitudinal sectional view showing a protruding wall surrounding each of the rotation operating sections of the right and left aiming screws as a key portion of a fourteenth embodiment of the present invention.
Figure 28:
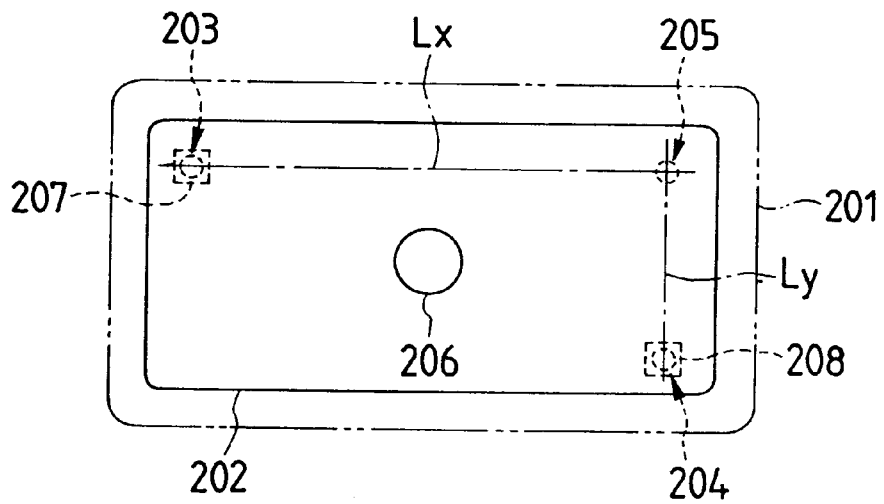
FIG. 28 is a front view of a conventional automobile headlamp.
Figure 29:
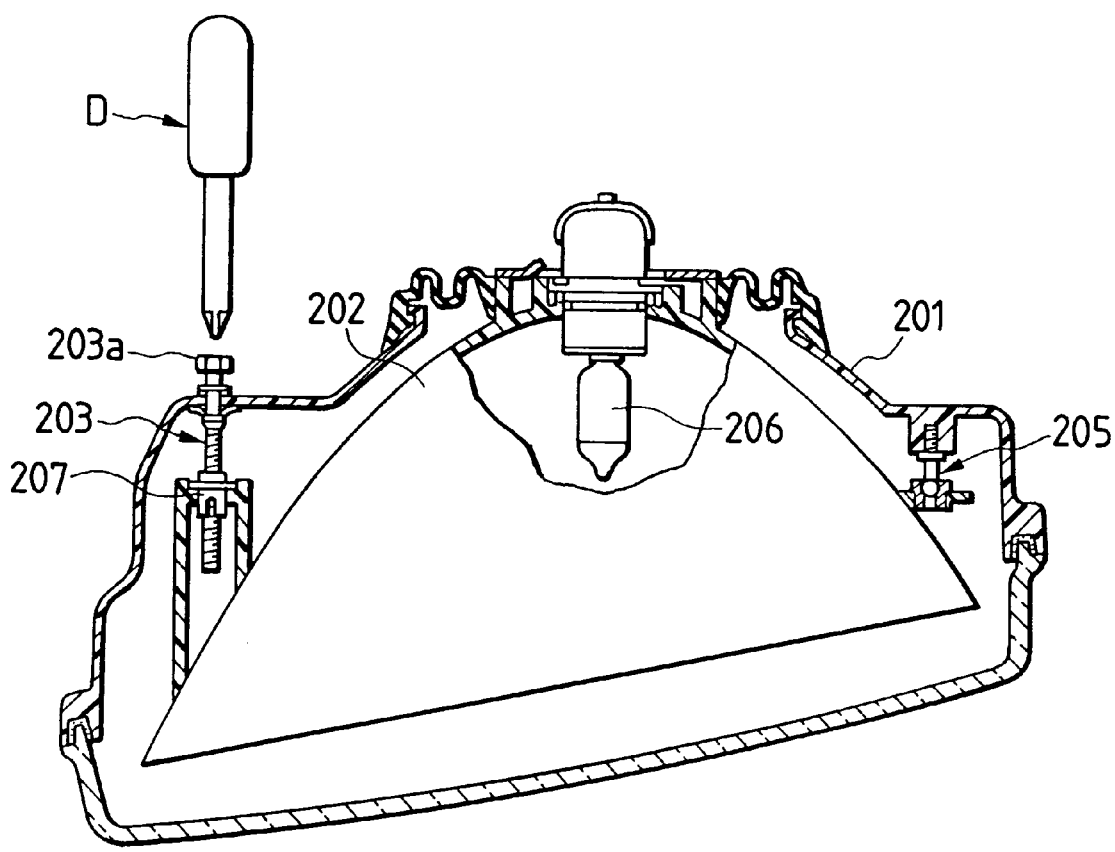
FIG. 29 is a horizontal sectional view of the conventional automobile headlamp.

Another embodiment of the invention is illustrated in FIG. 27. The embodiment corresponds to the thirteenth embodiment whose right and left side walls are cut out at the roots of the slits 72, viz., only the tongue-shaped portions 74 are extended rearward. This structure is advantageous in that the rearward extension of the protruding wall is reduced in length when the tongue-shaped portions 74 are thermally bent.

While the right and left side walls extended rearwardly of the protruding walls 12H and 12I are arcuate in cross section these side walls may be flat, if necessary.

In the thirteenth and fourteenth embodiments, the protruding walls 12H and 12I cover each the entire circumference of the rearward extension of the aiming screw 30. In the structure where the distal end part of the rearward extension of the protruding wall is bent to cover the rotation operating section 31, the rearward extension of the aiming screw 30 may be partly covered over its circumference.

Effect(s) of the Invention

As is apparent from the above description, according to the automobile headlamp of the first aspect of the present invention, headlamps of different aiming specifications can be formed with ease; that is, they can be formed depending on whether or not the lid, namely, the tongue-shaped plate is folded to close the opening of the protruding walls. Hence, one and the same lamp body can be applied to headlamps of different aiming specifications, and accordingly the resultant headlamps are low in manufacturing cost.

The lid, namely, the tongue-shaped plate is integral with the protruding wall, which simplifies the maintenance and the assembling work of the headlamp as much.

According to the automobile headlamp of the second aspect of the invention, the tongue-shaped plate is simple in configuration being flush with the protruding wall. Hence, its metal mold is simple, and the protruding wall and the tongue-shaped plate may be integral with the lamp body.

According to the automobile headlamp of the third aspect of the invention, any one is able to close the lid, namely, the tongue-shaped plate. Hence, even a headlamp of a different aiming specification can be assembled with ease.

According to the automobile headlamp of the fourth aspect of the invention, the tongue-shaped plate is folded and held laid on the protruding wall, which makes it simple to turn the aiming screw.

According to automobile headlamp of the fifth aspect of the invention, depending on whether or not the cap is fixedly put on the protruding wall to close the opening of the latter to form headlamps of the different aiming specifications. Hence, one and the same lamp body can be applied to headlamps of different aiming specifications.

According to the automobile headlamp of the sixth aspect of the invention, the rotating operation section of the aiming screw to be turned can be observed through the upper opening formed in the protruding wall, which makes it simple to achieve the aiming operation.

According to the automobile headlamp of the seventh aspect of the invention, the outline of the cap which is fixedly put on the protruding wall is smaller than the outline of the protruding wall. Hence, the cap scarcely interfere with other components, and accordingly the cap is hardly removed from the protruding wall.

According to the automobile headlamp of the eighth aspect of the invention, depending on whether or not the rotating operation section is fixed by filling the seal material in the protruding wall to forming headlamps of different aiming specifications. Hence, one and the same lamp body can be applied to headlamps of different aiming specifications.

According to the automobile headlamp of the ninth aspect of the invention, the rotating operation section is covered with the seal material filled in the protruding wall. Hence, the resultant headlamp is of an aiming specification that the turning of the aiming screw surrounded by the protruding wall is positively inhibited.

According to the tenth aspect of the invention, the head lamps may be constructed according to different aiming specifications in such a simple manner that to cover the rotation operating section, the tongue-shaped portions which constitute a part of the protruding wall is merely bent by its thermal deformation, and any additional member is not used. Therefore, one lamp body may be used for constructing different types of head lamps, or the head lamps constructed according to different aiming specifications.

In the automobile headlamp of the eleventh aspect of the invention, the tongue-shaped portions are confronted with each other. With this structure, the rearward extension of the protruding wall is reduced in length. This implies that there is a less chance of the interference of the protruding wall with other members.

In the automobile headlamp of the twelfth aspect of the invention, the tongue-shaped portions are bent, so that the portion extended rearwardly of the protruding wall is reduced in length. With this technical feature, in an automobile headlamp constructed according to a specification that requires no turn of the horizontal aiming screw, the portion extended rearwardly of the protruding wall is reduced in length. And there is a less chance of the interference of the protruding wall with other members.

What is claimed is:

1. An automobile headlamp comprising:

a lamp assembly having a light source unit;

an aiming mechanism for operating said light source unit to incline with respect to an automobile body vertically and horizontally, said aiming mechanism comprising a vertical aiming screw and a horizontal aiming screw, rotating operation sections of said aiming screws being disposed outside of said lamp assembly, said rotating operation sections being rotated to vertically and horizontally incline said light source unit;

a protruding wall extending from said lamp assembly and surrounding at least said rotating operation section of said horizontal aiming screw, said protruding wall comprising an opening; and means for selectively closing said opening of said protruding wall.

2. An automobile headlamp as claimed in claim 1, wherein said closing means comprises a foldable tongue-shaped plate extending from said protruding wall, and said protruding wall comprises a thin hinge connecting to said tongue-shaped plate and a locking member engageable with said tongue-shaped plate.

3. An automobile headlamp as claimed in claim 2, wherein said protruding wall extends in substantially horizontal direction, and said tongue-shaped plate extends in such a manner that said tongue-shaped plate is substantially flush with the upper surface of said protruding wall.

4. An automobile headlamp as claimed in claim 2, wherein said locking member is disposed between a tongue-shaped plate extending end portion and said protruding wall end portion.

5. An automobile headlamp as claimed in claim 2, further comprising a second locking member disposed between said tongue-shaped plate and said protruding wall extending end portion, second locking means holding said tongue-shaped plate which has been folded along said thin hinge in such a manner that said tongue-shaped plate is laid on said protruding wall.

6. An automobile headlamp as claimed in claim 1, wherein said closing means comprises a cap for covering the rotating operation section, and said cap is fixedly press-fittable in a protruding wall extending end portion.

7. An automobile headlamp as claimed in claim 6, wherein said protruding wall extends in a substantially horizontal direction, and the upper portion of said protruding wall is formed into an opening which exposes said rotating operation section in such a manner that said cap is not fixed, while the lower portion of said protruding wall is formed into an opening which functions as a water draining hole.

8. An automobile headlamp as claimed in claim 6, wherein the outline of said cap is equal to or smaller than the outline of said protruding wall extending end portion.

9. An automobile headlamp as claimed in claim 1, wherein said closing means comprises a seal material fillable in said protruding wall.

10. An automobile headlamp as claimed in claim 9, wherein said rotating operation section of said horizontal aiming screw is covered with said seal material filled in said protruding wall.

11. An automobile headlamp as claimed in claim 1, wherein said protruding wall extends from said lamp assembly up to a position beyond each said rotation operating section while surrounding each said rotation operating section, said protruding wall comprises slits formed at and along corners of portions extending of said protruding wall, while axially extending, said closing means comprises tongue-shaped portions formed between said slits in said extending portion of said protruding wall, and said tongue-shaped portions being bendable by its thermal deformation to cover each said rotation operating section.

12. An automobile headlamp as claimed in claim 11, wherein said tongue-shaped portions are confronted with each other with respect to each said rotation operating section.

13. An automobile headlamp as claimed in claim 11, wherein said extending portion of said protruding wall, other portions than said tongue-shaped portions are cut out at and near to the roots of said tongue-shaped portions.

* * * * *